Patented Feb. 4, 1941

2,230,387

UNITED STATES PATENT OFFICE 2,230,387

PRODUCTION OF PURIFIED CELLULOSE ESTERS

George Schneider, Montclair, N. J., assignor to Celanese Corporation of America, a corporation of Delaware No Drawing. Application March 15, 1939, Serial No. 261,975

10 Claims. (Cl. 260—230)

This invention relates to the treatment of organic esters of cellulose and relates more particularly to a process for the production of more stable organic esters of cellulose.

An object of this invention is the provision of an improved process of treating organic esters of cellulose to enhance the stability thereof.

A further object of this invention is to provide a process for separating from the esters, obtained by precipitating the same from the primary solutions in which they are formed, the constituents of the esters that tend to lower the clarity, the heat test and/or the viscosity characteristics thereof by heating a solution of the esters in an organic solvent for said esters and then reprecipitating the same.

Other objects of this invention will appear from the following detailed description and claims.

Organic esters of cellulose, as ordinarily made in commercial practice, are not homogeneous but are made up of ingredients or constituents which vary considerably in properties, particularly as to their solubility in organic solvents, their heat resistance and their viscosity characteristics.

The more soluble ingredients or constituents of the organic esters of cellulose have the lower heat resistance and lower viscosity characteristics. While any organic ester of cellulose may be treated in accordance with my invention, e. g. cellulose formate, cellulose acetate, cellulose propionate and cellulose butyrate, in order to simplify the description thereof I will describe the same in connection with the treatment of cellulose acetate which at the present time is commercially the most important of the cellulose esters.

In accordance with my invention I remove the undesirable constituents from cellulose acetate and thereby improve the physical properties thereof by treating the cellulose acetate with a suitable solvent or solvent mixture and heating the same to boiling under reflux until solution is completed. The cellulose acetate is then precipitated by diluting the solution with a nonsolvent for the cellulose acetate or by cooling the same to room temperature. The supernatant liquid is then decanted, the precipitate washed with the solvent and finally washed neutral and dried. Generally, the most satisfactory results are obtained in precipitating the cellulose acetate by cooling rather than by dilution since dilution may bring down some of the undesirable degraded product with the desired cellulose acetate.

In a preferred method of carrying out my invention, unstable cellulose acetate obtained by precipitating the same from its primary solution is treated with acetic acid of a concentration of approximately 40% and heated to boiling under reflux. The concentration of the acetic acid is then adjusted by the addition of either more acetic acid or more water so that the cellulose acetate is just in solution, i. e., the addition of a small amount of water would cause a clouding. The solution is then boiled again for a short time, say 10 to 15 minutes, and cooled rapidly to about room temperature, thus precipitating the cellulose acetate. The supernatant liquid is then decanted, the cellulose acetate washed with acetic acid of the same concentration as originally employed as solvent, and finally washed neutral and dried. By this method there is obtained cellulose acetate having physical characteristics which show a substantial improvement over those of the cellulose acetate before treatment in quantity equal to from 70 to 75% of the original cellulose acetate.

The cellulose acetate treated in accordance with my process has a lower sulphate content and a higher heat test. Accordingly, the purified cellulose acetate is more stable, and yarns, filaments and fabrics made from the purified cellulose acetate may be safely ironed at higher temperatures.

In order further to illustrate my invention but without being limited thereto, the following specific examples are given.

Example I 300 parts by weight of acetic acid of a concentration of 39.6% are added to 100 parts by weight of unstabilized cellulose acetate and the mixture is heated to boiling under reflux. The concentration of the acetic acid is then adjusted by the addition of either more acetic acid or more water so that the cellulose acetate is just in solution. The time taken to prepare this solution is 40 minutes. The solution is then boiled again for 15 minutes and cooled in 1¼ hours to 30° C. The supernatant liquid is decanted and the precipitated cellulose acetate washed once with acetic acid of the same concentration as used to dissolve the cellulose acetate and then washed neutral and dried.

71.2 parts by weight of purified cellulose acetate is recovered, which purified cellulose acetate is stabilized and has a higher heat test than the cellulose acetate before treatment.

Example II 300 parts by weight of acetic acid of a concentration of 41.5% are added to 100 parts by weight of unstabilized cellulose acetate and the mixture is heated to boiling under reflux. The concentration of the acetic acid is then adjusted by the addition of either more acetic acid or more water so that the cellulose acetate is just in solution. The time taken to prepare this solution is 45 minutes. The solution is then boiled again for 10 minutes and cooled in ½ hour to room temperature. The supernatant liquid is decanted and the precipitated cellulose acetate washed once with acetic acid of the same concentration as used to dissolve the cellulose acetate and then washed neutral and dried.

72 parts by weight of purified cellulose acetate is recovered, which purified cellulose acetate is stabilized and has a higher heat test than the cellulose acetate before treatment.

It is to be understood that the foregoing detailed description is given merely by way of illustration and that many variations may be made therein without departing from the spirit of my invention.

Having described my invention, what I desire to secure by Letters Patent is:

1. Process for the production of purified lower fatty acid esters of cellulose, which comprises treating an unstable lower fatty acid ester of cellulose with a dilute aqueous solution of an organic acid which is a solvent therefor, heating the resulting mixture to boiling to dissolve the said ester in the said solution, refluxing the resulting solution for a short time and then precipitating the purified organic acid ester of cellulose.

2. Process for the production of purified cellulose acetate, which comprises treating unstable cellulose acetate with a dilute aqueous solution of an organic acid which is a solvent therefor, heating the resulting mixture to boiling to dissolve the said cellulose acetate in the said solution, refluxing the resulting solution for a short time and then precipitating the purified cellulose acetate.

3. Process for the production of purified lower fatty acid esters of cellulose, which comprises treating an unstable lower fatty acid ester of cellulose with an aqueous solution of an organic acid, which is a solvent therefor, having a concentration of about 40%, heating the resulting mixture to boiling to dissolve the said ester in the said solution, refluxing the resulting solution for a short time and then precipitating the purified organic acid ester of cellulose.

4. Process for the production of purified cellulose acetate, which comprises treating unstable cellulose acetate with a dilute solution of acetic acid, heating the resulting mixture to boiling to dissolve the said cellulose acetate in the said solution, refluxing the resulting solution for a short time and then precipitating the purified cellulose acetate.

5. Process for the production of purified cellulose acetate, which comprises treating unstable cellulose acetate with a solution of acetic acid, having a concentration of about 40%, heating the resulting mixture to boiling to dissolve the said cellulose acetate in the said solution, refluxing the resulting solution for a short time and then precipitating the purified cellulose acetate.

6. Process for the production of purified cellulose acetate, which comprises treating unstable cellulose acetate with acetic acid of a concentration of about 40%, heating the mixture to boiling under reflux, adjusting the concentration of the acetic acid so that the cellulose acetate is just in solution, refluxing the resulting solution for a short time and then precipitating the purified cellulose acetate.

7. Process for the production of purified cellulose acetate, which comprises treating unstable cellulose acetate with acetic acid of a concentration of about 40%, heating the mixture to boiling under reflux, adjusting the concentration of the acetic acid so that the cellulose acetate is just in solution, refluxing the resulting solution for a short time and rapidly cooling the solution whereby the purified cellulose acetate is precipitated.

8. Process for the production of purified cellulose acetate, which comprises treating unstable cellulose acetate with acetic acid of a concentration of about 40%, heating the mixture to boiling under reflux, adjusting the concentration of the acetic acid so that the cellulose acetate is just in solution, again heating the solution to boiling for 10 to 15 minutes and rapidly cooling the solution whereby the purified cellulose acetate is precipitated.

9. Process for the production of purified cellulose acetate, which comprises treating unstable cellulose acetate with acetic acid of a concentration of about 40%, heating the mixture to boiling under reflux, adjusting the concentration of the acetic acid so that the cellulose acetate is just in solution, again heating the solution to boiling for 10 to 15 minutes and rapidly cooling the solution to a temperature at most 30° C. whereby the purified cellulose acetate is precipitated.

10. Process for the production of purified cellulose acetate, which comprises treating unstable cellulose acetate with acetic acid of a concentration of about 40%, heating the mixture to boiling under reflux, adjusting the concentration of the acetic acid so that the cellulose acetate is just in solution, again heating the solution to boiling for 10 to 15 minutes and cooling the solution in about ½ hour to room temperature whereby the purified cellulose acetate is precipitated.

GEORGE SCHNEIDER.